Apr. 3, 1923.

R. E. ANDERSON 1,450,781

DRAFT EQUALIZER

Filed May 27, 1920

Inventor
Raymond E. Anderson,

By

Attorney

Patented Apr. 3, 1923.

1,450,781

UNITED STATES PATENT OFFICE.

RAYMOND E. ANDERSON, OF BOONE, IOWA.

DRAFT EQUALIZER.

Application filed May 27, 1920. Serial No. 384,589.

*To all whom it may concern:*

Be it known that I, RAYMOND E. ANDERSON, a citizen of the United States of America, residing at Boone, in the county of Boone and State of Iowa, have invented new and useful Improvements in Draft Equalizers, of which the following is a specification.

The object of the invention is to provide a draft equalizing means adapted for use in connection with farm and agricultural machinery and vehicles whereby a variable number of horses or other draft animals may be connected with the machine or vehicle under conditions which will insure an equalization of the work and the progress of the machine or vehicle in a direct path or movement, with the draft animals arranged within a comparatively restricted area transversely of the path of the machine or vehicle, and with this object in view the invention consists in a construction and combination of parts of which a preferred embodiment is shown in the accompanying drawing wherein:

Figure 1:
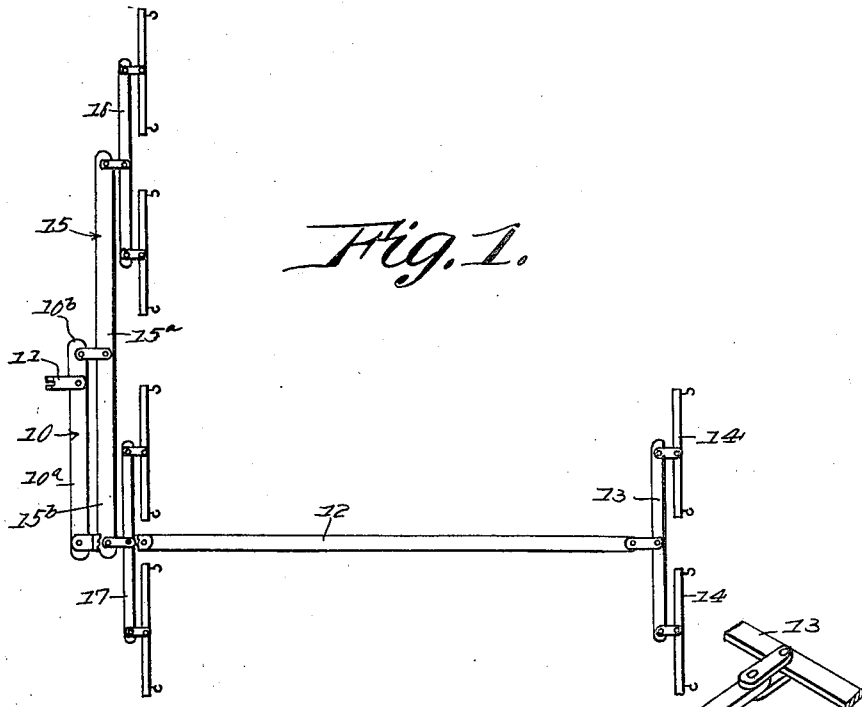
Figure 1 is a plan view of the apparatus.
Figure 2:
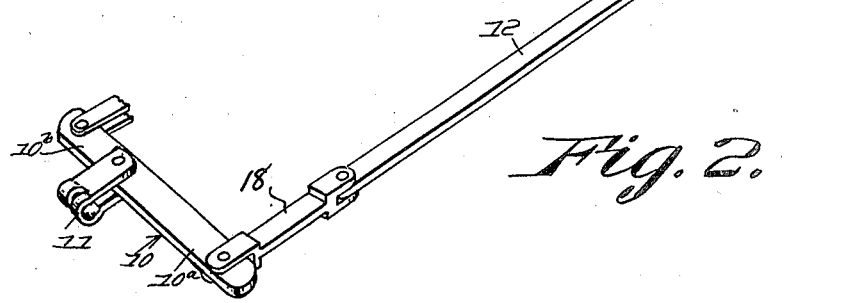
Figure 2 is a detail view in perspective of the leader member thereof.

The device consists essentially of an equalizing bar 10 connected pivotally at an intermediate point adjacent to one end with a clevis 11 for attachment to the vehicle or machine to be drawn, and thus providing relatively long and short outer and inner arms $10^a$ and $10^b$ with the former of which is connected a leader bar 12 fitted at its forward end for example with a double-tree 13 with which obviously may be connected the usual single-trees 14, or which may be extended or reduced to accommodate any desired number of draft animals.

With the other or shorter arm of the equalizing bar there is connected a double-tree beam 15 with which, if the arms as shown in the drawing are of equal length may be connected the double trees 16 and 17, but which obviously may be modified in proportions, so far as the respective lengths of its arms $15^a$ and $15^b$ are concerned to provide for a distribution of double-trees which will accommodate either a fewer or a greater number of draft animals, under conditions which will be readily understood by anyone familiar with the art to which the invention pertains.

In other words by employing primarily an equalizing beam such as that indicated at 10 with the arms of which are respectively connected hitching means disposed respectively in forward and rearward relations with reference to each other, it is possible to vary the number of hitches within a relatively wide range to accommodate a practically unlimited number of draft animals to suit the work to be performed and the conditions under which the same is to be accomplished. The advantage of the structure therefore resides in the fact that the oppositely extending arms of the equalizing beam are connected with animal hitching means of which one set is located in advance of the other a distance sufficient to accommodate draft animals arranged in tandem. In order that the arm $15^b$ of the double-tree 15 may be free from interference by the leader bar 12, the latter is connected to the equalizer bar 10 by means of a link 18 which is provided with fulcrumed extremities straddling the arm $10^a$ and the rear end of the leader bar 12 to both of which the link is obviously connected, the intermediary point of the link being relatively thin to provide a space between the fork end in which the extremity of the bar end 15 may be moved.

What is claimed is:

A draft equalizer having an intermediately fulcrumed equalizing bar, an equalizer arm pivotally connected with one arm of said bar and having hitching means connected respectively with the extremities thereof, a leader bar having draft equalizing means at its forward end, and a link having bifurcated extremities straddling respectively the remaining arm of the equalizer bar and the rear end of the leader bar, the said link being reduced in thickness between the said bifurcated extremities to provide clearance space for the adjacent end of the equalizing beam.

In testimony whereof he affixes his signature.

RAYMOND E. ANDERSON.